Sept. 4, 1945.  A. E. ANDERSON  2,384,362
AUTOMATIC RECLOSING CIRCUIT BREAKER SYSTEM
Filed June 23, 1942
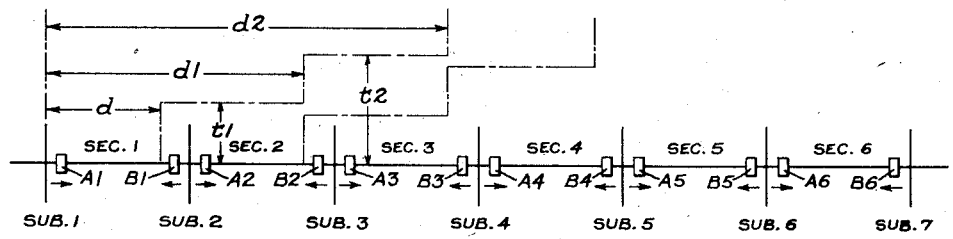
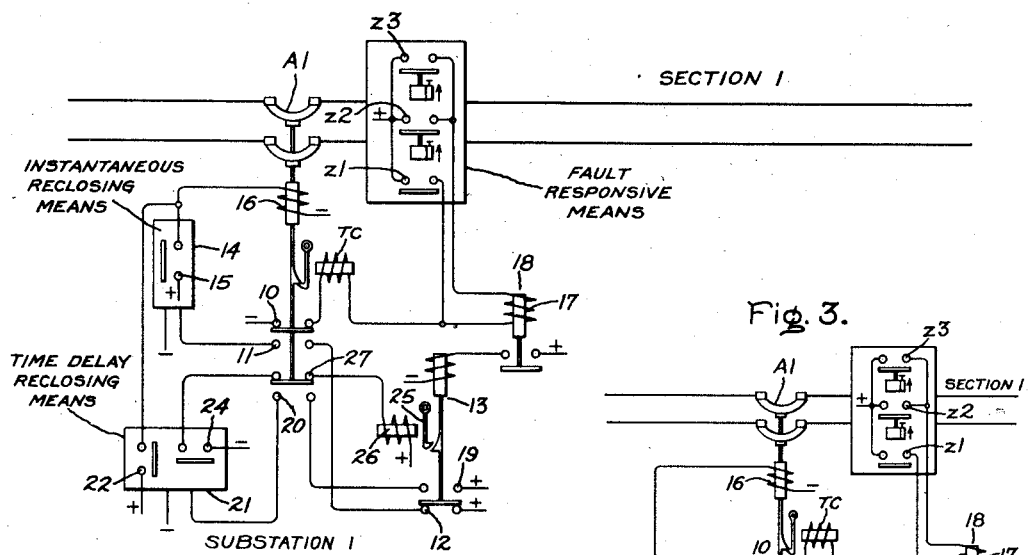
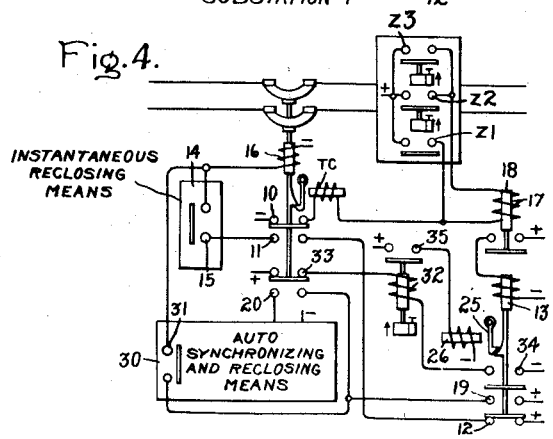
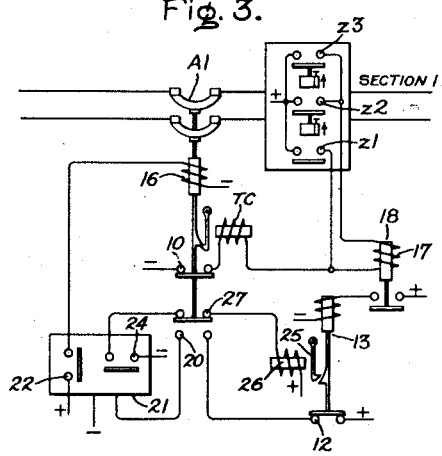
Inventor:
Arvid E. Anderson,
by Harry E. Dunham
His Attorney.

Patented Sept. 4, 1945

2,384,362

UNITED STATES PATENT OFFICE 2,384,362

AUTOMATIC RECLOSING CIRCUIT
BREAKER SYSTEM

Arvid E. Anderson, Haverford Township, Delaware County, Pa., assignor to General Electric Company, a corporation of New York Application June 23, 1942, Serial No. 448,089

24 Claims. (Cl. 175—294)

My invention relates to automatic circuit breaker systems, and particularly to a system for controlling the reclosing of a circuit breaker which, under fault conditions, is arranged to be opened after a time dependent upon the distance of the fault from the circuit breaker.

It has been common practice to provide various protective arrangements for effecting the opening of a circuit breaker in a time varying with the distance of the fault from the circuit breaker. For example, in an electric system comprising a plurality of series connected sections with a circuit breaker at each end of each section, each circuit breaker is often provided with means for effecting an instantaneous opening thereof when a fault occurs on the associated section, for effecting the opening thereof a predetermined time interval after the fault occurs when the fault is within a longer predetermined distance from the circuit breaker and is not cleared elsewhere within said predetermined time interval, and for effecting the opening thereof after a longer predetermined time interval when the fault is within a still longer predetermined distance from the circuit breaker and is not cleared elsewhere within said longer predetermined time interval.

In order to maintain stability in such an electric system, it is sometimes desirable to effect a quick reclosure of a circuit breaker after an instantaneous opening thereof, whereas after a time delayed opening of the circuit breaker, it is desirable not to effect an automatic reclosure thereof until conditions have become stable, so that automatic synchronizing or other switching operations may be performed.

One object of my invention is to provide an improved automatic reclosing circuit breaker system in which the time elapsing between the opening and the first reclosure of the circuit breaker depends upon the distance of the fault from the circuit breaker, or the time required to trip the circuit breaker.

Another object of my invention is to provide an improved automatic reclosing circuit breaker system in which the time elapsing between the opening and reclosure of the circuit breaker depends upon the particular protective device effecting the opening thereof.

My invention will be better understood from the following description when taken in connection with the accompanying drawing, and its scope will be pointed out in the appended claims.

In the accompanying drawing, Fig. 1 is a schematic diagram of an electric system divided by substations into six sections, each of which has at each end thereof a circuit breaker which may be provided with my improved automatic reclosing circuit breaker arrangement; Fig. 2 diagrammatically illustrates an automatic reclosing circuit breaker system embodying my invention which may be used to control each of the circuit breakers shown in Fig. 1, and Figs. 3 and 4 diagrammatically illustrate other embodiments of my invention which may be used to control each of the circuit breakers shown in Fig. 1.

In the electric system shown in Fig. 1, each of the six sections has a circuit breaker at each end thereof, such as the circuit breakers A1 and B1 at the ends of section 1, A2 and B2 at the ends of section 2, etc. For the purpose of this description, it is assumed that each of the circuit breakers is controlled by suitable protective means so that it is opened instantaneously when a fault occurs in the respective section within a predetermined distance from the associated substation, after a predetermined time interval when the fault occurs in the next section within a predetermined distance from the respective substation and is not cleared by the opening of any of the intermediate circuit breakers, and after a longer predetermined time interval when the fault occurs in the second section beyond but within a predetermined distance from the respective substation and is not cleared by the opening of any of the intermediate circuit breakers. For example, the circuit breaker A1 at the substation 1 at the left-hand end of section 1 is arranged to be opened instantaneously when a fault occurs on the section 1 and after a time interval $t1$ when the fault is in section 2 and within the distance $d1$ from the substation 1 and the circuit breaker A2 at the substation 2 has not operated within the time interval $t1$ to clear the fault, and after a time interval $t2$ when the fault is in section 3 and within the distance $d2$ from the substation 1 and neither the circuit breaker A2 or A3 at substations 2 and 3 respectively has operated within the time interval $t2$ to clear the fault. United States Letters Patent 2,011,387, granted August 13, 1935, on an application filed by A. R. Van C. Warrington and assigned to the same assignee as this application, discloses in detail suitable fault protective means, which may be employed to effect such a time-distance opening of each of the circuit breakers in Fig. 1. Since the details of the connections of such fault responsive means form no part of my present invention, I have merely indicated in Fig. 2 such fault responsive means by a suitably labeled rectangle, including three sets of contacts $z1$, $z2$, and $z3$, contacts $z1$ being closed instantaneously when the fault occurs within the distance $d$ from the substation 1, contact $z2$ being closed after a time interval $t1$ when the fault occurs within the distance $d1$ from the substation 1, and the contacts $z3$ being closed after a time interval $t2$ when the fault occurs within the distance $d2$ from the substation 1. While in Fig. 1, I have illustrated a tripping arrangement which effects an instantaneous tripping of a circuit breaker only when the fault is within a predetermined portion of the adjacent section, it will be obvious that my invention is equally applicable to other well known fault responsive systems, such as carrier current pilot systems which effect an instantaneous tripping of a circuit breaker in response to a fault anywhere within the adjacent section.

In Fig. 2 which diagrammatically illustrates an embodiment of my invention controlling the circuit breaker A1 in Fig. 1 and which may be used to control in a similar manner each of the other circuit breakers, the contacts $z1$ of the fault responsive means are shown as being arranged to complete an energizing circuit for the trip coil TC of the circuit breaker A1 through the auxiliary contacts 10 of the circuit breaker A1. For effecting the instantaneous reclosure of the circuit breaker A1 when it is opened in response to the closing of the contacts $z1$, the auxiliary contacts 11 of the circuit breaker, when it opens, complete through contacts 12 of a control relay 13 an energizing circuit for suitable instantaneous reclosing means 14, examples of which are well known in the art, so that the instantaneous reclosing means immediately closes its contacts 15 to complete an energizing circuit for the closing coil 16 of the circuit breaker A1 to effect a single instantaneous reclosure thereof. United States Letters Patent 2,059,836, granted November 3, 1936, on an application filed by me and assigned to the same assignee as this application, discloses in detail an instantaneous reclosing arrangement which may be used as the instantaneous reclosing means 14. However, since the details of such a reclosing arrangement constitute no part of my present invention, I have schematically illustrated such an arrangement by a suitably labeled rectangle in order to simplify the disclosure.

For effecting a time delayed reclosure of the circuit breaker A1 when it is opened by a fault which occurs beyond the distance $d$ in Fig. 1 and which effects the closing of either the contacts $z2$ or $z3$, depending upon the location of the fault, I connect the winding 17 of a control relay 18 in series with the contacts of the parallel connected contacts $z2$ and $z3$ in the trip circuit of the trip coil TC so that the relay 18 is energized when either the contacts $z2$ or $z3$ are closed to effect the energization of the trip coil TC. The relay 18 in turn completes, when energized, an energizing circuit for the control relay 13 so that it opens its contacts 12 in the energizing circuit for the instantaneous reclosing means 14 and closes its contacts 19. The closing of the contacts 19 completes through the contacts 20 of the circuit breaker A1 an energizing circuit for a time delay reclosing means 21 of any suitable type, examples of which are well known in the art, so that after being in operation for a predetermined time, it closes its contacts 22 in an energizing circuit for the closing coil 16 of the circuit breaker A1 to effect a reclosure thereof. United States Letters Patent 1,676,974, granted July 10, 1928, on an application filed by me and assigned to the assignee of this application, discloses a motor driven timing device which may be used as the time delay reclosing means 21 to effect a predetermined number of successive time delayed closures of the contacts 22 if the circuit breaker A1 does not remain closed after each time delayed reclosure and to effect the closing of the contacts 24 after the timing device has been in operation for a sufficient time to effect a predetermined number of time delayed reclosures of the circuit breaker A1.

The control relay 13 is shown as being of the lockout type so that it is held in its energized position by a latch 25 until released by the energization of a release magnet 26, the circuit of which is arranged to be completed by the closing of the contacts 24 of the reclosing means 21 in case the contacts 27 of the circuit breaker A1 are closed at the instant when the contacts 24 are closed.

The operation of the automatic reclosing circuit breaker arrangement shown in Fig. 2 will be obvious from the above description. When an instantaneous opening of the circuit breaker A1 is effected by the fault responsive means, the instantaneous reclosing means 14 is operated to effect an instantaneous reclosure of the circuit breaker. When, however, a time delay opening of the circuit breaker is effected by the fault responsive means, the relay 13 is operated to prevent the instantaneous reclosing means 14 from effecting an instantaneous reclosure and to initiate the operation of the time delay reclosing means 21 to effect a predetermined number of time delayed reclosures of the circuit breaker.

If the circuit breaker remains closed after any one of the time delayed reclosures, the control relay 13 is automatically reset to its normal position as soon as the time delay reclosing means 21 closes its contacts 24 so as to compelte an energizing circuit for the release magnet 26 through the auxiliary contacts 27 on the circuit breaker A1.

While in Fig. 2 I have disclosed an arrangement in which the time delayed reclosures are effected independently of the relative voltage conditions of the two sections to be connected together by the circuit breaker A1, it will be obvious to those skilled in the art that any of the various well known arrangements, such for example as the arrangement disclosed in United States Letters Patent 1,731,966, granted October 15, 1929, to the assignee of this application on an application filed by me, may also be used to control the time delayed reclosure of the circuit breaker in accordance with the magnitude and phase relation of the voltages of the two adjacent sections when they are both simultaneously energized.

In some instances, the instantaneous reclosing means may be incorporated in the time delay reclosing means. Such an arrangement is disclosed in United States Letters Patent 2,049,308, granted July 28, 1936, to the assignee of this application on an application filed by John H. Miles. When such a reclosing arrangement is used, it may be desirable to prevent the operation thereof whenever the fault is outside of the adjacent section. In Fig. 3 I have illustrated an arrangement for preventing the reclosing means from effecting any reclosure of the circuit breaker when the fault is outside of the adjacent section. The circuit arrangement shown in Fig. 3 is similar to the circuit arrangement shown in Fig. 2, except that the normally closed contacts 12 of the lock-out relay 13 are in the starting circuit of the reclosing means 21. Therefore, when a fault occurs at such a distance from the circuit breaker A1 as to effect the closing of either the contacts 22 or 23, the lock-out relay 13 is operated to prevent the reclosing means 21 from effecting any automatic reclosures of the circuit breaker. However, if the fault is on the adjacent section 1 so that the contacts 21 of the fault responsive means are closed, the lock-out relay 13 is not operated and therefore the reclosing means 21 is operative to effect an instantaneous reclosure or an instantaneous reclosure and a plurality of subsequent time delayed reclosures.

When a circuit breaker is opened in response to the operation of the time delay fault responsive means, there is a possibility that by the time the circuit breaker is opened, the synchronous machines respectively connected to the two adjacent sections are so out of step that it may not be desirable to reclose the circuit breaker until the machines are again in synchronism or near enough thereto so that they will immediately pull into synchronism when connected together. In Fig. 4 I have illustrated a modification of the arrangement shown in Fig. 2 whereby such a result may be accomplished. Instead of using the time delay reclosing means 22 of Fig. 2 I employ an automatic synchronizer 30 of any suitable type, examples of which are well known in the art, whereby the contacts 31 thereof are closed only when a predetermined phase magnitude and frequency relation exists between the voltages of the two adjacent sections. Since the detail circuit connections of such a synchronizer 30 are well known in the art and form no part of my present invention, I have schematically illustrated such a synchronizer by a suitably labeled rectangle in order to simplify the disclosure. The automatic synchronizer 30 is arranged to be placed in operation by the closing of the contacts 19 of the lock-out relay 13 which are connected in series with the contacts 20 of the circuit breaker A1 in a starting circuit for the automatic synchronizing means 30. The closing of the contacts 31 of the automatic synchronizer 30 is arranged to complete through the contacts 19 of the lock-out relay 13 an energizing circuit for the closing coil 16 of the breaker A1 so that when a fault occurs that effects the closing of either the contacts 22 or 23, the reclosing of the circuit breaker A1 is effected by the automatic synchronizer 30 instead of the instantaneous reclosing means 14. In order to reset the lock-out relay 13 in case the circuit breaker remains closed after being reclosed by the automatic synchronizing means 30, I provide a time relay 32, which is arranged to be energized whenever the circuit breaker A1 is closed and the lock-out relay 13 is in its locked-up position. This result is accomplished by connecting in the energizing circuit of the time relay 32 the contacts 33 of the circuit breaker A1 and the contacts 34 of the lock-out relay 13. The closing of the contacts 35 of the time relay 33 completes an energizing circuit for the release magnet 26 of the lock-out relay 13.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. A control arrangement for a circuit breaker in an electric circuit comprising means responsive to a fault on said circuit for effecting the opening of said circuit breaker after a time interval dependent upon the location of the fault on said circuit, and means controlled by said fault responsive means for effecting the initial reclosure of said circuit breaker after different time intervals.

2. A control arrangement for a circuit breaker in an electric circuit comprising fault responsive means selectively responsive to the distance of a fault on said circuit from said circuit breaker for effecting the opening of said circuit breaker, and means controlled by said fault responsive means for effecting the initial reclosure of said circuit breaker after a time interval which varies with the location of the fault.

3. A control arrangement for a circuit breaker in an electric circuit comprising fault responsive means selectively responsive to the distance of a fault on said circuit from said circuit breaker for effecting the opening of said circuit breaker after different predetermined time intervals which depend upon the location of the fault, and means controlled by said fault responsive means for effecting the reclosure of said circuit breaker immediately after it is opened when the fault is within a predetermined distance from said circuit breaker and for effecting the reclosure of said circuit breaker after it has remained opened for at least a predetermined time interval when the fault is beyond said predetermined distance from said circuit breaker.

4. A control arrangement for a circuit breaker in an electric circuit comprising means responsive to a fault occurring within a predetermined distance from said circuit breaker for effecting an instantaneous opening and reclosure of said circuit breaker, and means responsive to a fault occurring beyond said predetermined distance from said circuit breaker for effecting a time delayed opening and reclosure of said circuit breaker.

5. A control arrangement for a circuit breaker in an electric circuit comprising means responsive to a fault on said circuit for effecting under predetermined conditions an instantaneous opening of said circuit breaker and under other predetermined conditions a time delayed opening of said circuit breaker, and means for effecting an instantaneous reclosure of said circuit breaker after an instantaneous opening thereof and a time delayed reclosure after a time delayed opening thereof.

6. An arrangement for reclosing a circuit breaker in an electric circuit after the circuit breaker is opened by a fault on said circuit comprising means for effecting instantaneous reclosures of said circuit breaker, means for effecting time delayed reclosures of said circuit breaker, and means responsive to the location of a fault on said circuit for selectively effecting the operation of one of said reclosing means in accordance with the location of the fault.

7. An arrangement for reclosing a circuit breaker in an electric circuit after the circuit breaker is opened by a fault on said circuit comprising means for effecting instantaneous reclosures of said circuit breaker, means for effecting time delayed reclosures of said circuit breaker, and means responsive to the location of a fault on said circuit for selectively effecting the operation of said instantaneous reclosing means when the fault is within a predetermined distance from said circuit breaker and the operation of said time delayed reclosing means when the fault is beyond said predetermined distance.

8. A control arrangement for a circuit breaker in an electric circuit comprising means for effecting instantaneous reclosures of said circuit breaker, means for effecting time delayed reclosures of said circuit breaker, means responsive to a fault on said circuit within a predetermined distance from said circuit breaker for effecting the opening of said circuit breaker, means responsive to the opening of said circuit breaker for effecting the operation of said instantaneous reclosing means, means responsive to a fault on said circuit beyond said predetermined distance from said circuit breaker for effecting the opening of said circuit breaker and for rendering said instantaneous reclosing means inoperative to reclose said circuit breaker, and means controlled by said last mentioned fault responsive means for effecting the operation of said time delayed reclosing means.

9. An arrangement for reclosing a circuit breaker in an electric circuit after the circuit breaker is opened by a fault on said circuit comprising means for reclosing said circuit breaker when it is opened, and means dependent upon the distance of the fault from said circuit breaker for rendering said reclosing means inoperative when the fault occurs more than a predetermined distance from said circuit breaker.

10. An arrangement for reclosing a circuit breaker in an electric circuit after the circuit breaker is opened by a fault on said circuit comprising means for effecting an instantaneous reclosure of said circuit breaker when it is opened, and means controlled by the distance of the fault from said circuit breaker for rendering said instantaneous reclosing means inoperative when the fault occurs more than a predetermined distance from said circuit breaker.

11. A control arrangement for a circuit breaker in an electric circuit comprising fault responsive means for effecting the opening of said circuit breaker after different time intervals, means for effecting a reclosure of said circuit breaker when it is opened, and means controlled by said fault responsive means for rendering said reclosing means inoperative when the opening of said circuit breaker is delayed more than a predetermined time after the occurrence of a fault.

12. A control arrangement for a circuit breaker in an electric circuit comprising fault responsive means for effecting the opening of said circuit breaker, means for reclosing said circuit breaker when it is opened, and means controlled by said fault responsive means for rendering said reclosing means inoperative when said circuit breaker is not opened within a predetermined time after the occurrence of a fault.

13. An arrangement for reclosing a circuit breaker in an electric circuit after the circuit breaker is opened by a fault on said circuit comprising means for effecting an instantaneous initial reclosure of said circuit breaker when it is opened and a subsequent time delayed reclosure when it opens within a predetermined time after the initial reclosure, and means controlled by the distance of the fault from said circuit breaker for rendering said reclosing means inoperative to reclose said circuit breaker when the fault occurs more than a predetermined distance from said circuit breaker.

14. An arrangement for reclosing a circuit breaker in an electric circuit after the circuit breaker is opened by a fault on said circuit comprising means for effecting an instantaneous initial reclosure of said circuit breaker when it is opened and a subsequent time delayed reclosure when it opens within a predetermined time after the initial reclosure, and means controlled by the distance of the fault from said circuit breaker for rendering said reclosing means inoperative to effect an instantaneous reclosure when the fault occurs more than a predetermined distance from said circuit breaker.

15. A control arrangement for a circuit breaker in an electric circuit comprising fault responsive means for effecting the opening of said circuit breaker, means for effecting an instantaneous initial reclosure of said circuit breaker when it is opened and a subsequent time delayed reclosure when it opens within a predetermined time after the initial reclosure, and means controlled by said fault responsive means for rendering said reclosing means inoperative when said circuit breaker is not opened within a predetermined time after the occurrence of a fault.

16. A control arrangement for a circuit breaker in an electric circuit comprising fault responsive means for effecting the opening of said circuit breaker after different time intervals, means for effecting an instantaneous reclosure of said circuit breaker when it is opened, and means controlled by said fault responsive means for rendering said reclosing means inoperative when the opening of said circuit breaker is delayed more than a predetermined time after the occurrence of a fault.

17. A control arrangement for a circuit breaker in an electric circuit comprising fault responsive means for effecting the opening of said circuit breaker, means for effecting an instantaneous reclosure of said circuit breaker when it is opened, and means controlled by said fault responsive means for rendering said reclosing means inoperative when said circuit breaker is not opened within a predetermined time after the occurrence of a fault.

18. An arrangement for reclosing a circuit breaker between two alternating current circuits after the circuit breaker is opened by a fault on one of said circuits comprising means for effecting an instantaneous reclosing of said circuit breaker when said circuit breaker is opened within a predetermined time interval after the occurrence of a fault, and other reclosing means for effecting the reclosure of said circuit breaker when said circuit breaker is not opened within said predetermined time interval.

19. An arrangement for reclosing a circuit breaker between two alternating current circuits after the circuit breaker is opened by a fault on one of said circuits comprising means for effecting an instantaneous reclosing of said circuit breaker when said circuit breaker opened within a predetermined time interval after the occurrence of a fault, and automatic synchronizing means energized from said circuits for effecting the reclosure of said circuit breaker when said circuit breaker is not opened within said predetermined time interval.

20. An arrangement for reclosing a circuit breaker between two alternating current circuits after the circuit breaker is opened by a fault on one of said circuits comprising means for effecting an instantaneous reclosing of said circuit breaker independently of the relative phase relation of said circuits when said circuit breaker is opened within a predetermined time interval after the occurrence of a fault, and means dependent upon the phase relation of the voltages of said circuits for controlling the reclosure of said circuit breaker when said circuit breaker is not opened within said predetermined time interval.

21. An arrangement for reclosing a circuit breaker between two alternating current circuits after the circuit breaker is opened by a fault on one of said circuits comprising means for effecting an instantaneous reclosure of said circuit breaker only when said circuit breaker is opened within a predetermined time interval after the occurrence of a fault, and automatic synchronizing means for effecting a reclosure of said circuit breaker when said circuit breaker is not opened within said predetermined time interval.

22. A control arrangement for a circuit breaker interconnecting two alternating current circuits comprising fault responsive means for effecting an instantaneous opening of said circuit breaker, fault responsive means for effecting a time delayed opening of said circuit breaker, means for effecting an instantaneous reclosure of said circuit breaker in response to an instantaneous opening thereof, and other reclosing means for effecting a reclosure of said circuit breaker in response to each time delayed opening thereof.

23. A control arrangement for a circuit breaker interconnecting two alternating current circuits comprising fault responsive means for effecting an instantaneous opening of said circuit breaker, fault responsive means for effecting a time delayed opening of said circuit breaker, means for effecting an instaneous reclosure of said circuit breaker in response to an instantaneous opening thereof, and synchronizing means for effecting a reclosure of said circuit breaker in response to each time delayed opening thereof.

24. A control arrangement for a circuit breaker interconnecting two alternating current circuits comprising fault responsive means for effecting the opening of said circuit breaker, means controlled by said fault responsive means for effecting an instantaneous reclosing of said circuit breaker independently of the relative magnitudes of the voltages of said circuits when said circuit breaker is opened within a predetermined time interval after the occurrence of a fault, and means dependent upon the relative magnitudes of the voltages of said circuits for controlling the reclosure of said circuit breaker when said circuit breaker is not opened within said predetermined time interval.

ARVID E. ANDERSON.